United States Patent [19]
Doin et al.

[11] 3,986,456
[45] Oct. 19, 1976

[54] PYROTECHNIC GAS GENERATOR HAVING A MOVABLE COMBUSTION CHAMBER

[75] Inventors: Bernard J. Doin; Bernard E. Plantif, both of Saint Medard en Jalles; Michel C. Pasquier, Merignac; Jean-Francois Tillac, Bordeaux Cauderan, all of France

[73] Assignee: Societe Nationale des Poudres et Explosifs, France

[22] Filed: Apr. 2, 1975

[21] Appl. No.: 564,291

[30] Foreign Application Priority Data
Apr. 29, 1974  France .............................. 74.14898

[52] U.S. Cl. ................................ 102/39; 280/741; 23/281; 222/3
[51] Int. Cl.² .......................................... F42B 3/04
[58] Field of Search ............... 102/39; 280/150 AB; 23/281; 222/3

[56] References Cited
UNITED STATES PATENTS
3,618,976   11/1971   Leising et al. .................... 102/39 X

*Primary Examiner*—Stephen J. Lechert, Jr.
*Attorney, Agent, or Firm*—Bucknam and Archer

[57] ABSTRACT

A pyrotechnic gas generator for inflating safety cushions in vehicles, including a device for regulating the operating pressure and/or limiting the maximum gas pressure in the generator, comprises a combustion chamber defined in a cup-shaped member having its open end releasably held against a casing part and movable away from the casing part, by the gas pressure in the combustion chamber, to open up an injection orifice of variable through flow area which connects the combustion chamber with a cooling chamber containing solid coolant.

16 Claims, 6 Drawing Figures

PYROTECHNIC GAS GENERATOR HAVING A MOVABLE COMBUSTION CHAMBER

This invention relates to a pyrotechnic gas generator which includes solid coolant, and more particularly, but not exclusively, to such generators which are capable of producing a large volume of gas at a relatively low temperature within an extremely short period of time, and which can be used, for example, for rapidly expanding inflatable structures, such as safety cushions fitted to the dashboards of vehicles for protecting the people being conveyed in the event of a collision.

Numerous types of pyrotechnic gas generators are known, which comprise an ignition charge, a charge of powder or solid propellant, such as a composite solid propellant comprising an organic binder, an inorganic oxidising agent and additives such as a metal fuel or a plasticiser and one or more solid coolant charges.

Generators with concentric chambers, a central combustion chamber and peripheral cooling chambers connected in series, are also known. However, these generators have a limited reliability due to the pressure-limiting devices employed. Accidental excess pressure in the combustion chamber of a generator must be limited to avoid explosion of the generator or the dimensions must be undesirably large, but at the time the generator must be able to expand the cushion in order to ensure the protective function performed by the cushion.

Pressure-limiting devices used in known pyrotechnic gas generators consist of an orifice which brings the combustion chamber into communication either with the surrounding medium or with the cooling chamber or chambers of the generator, this orifice being sealed during normal operation and freed in the event of excess pressure, in order to increase the cross-section through which the combustion gases flow and hence limit the excess pressure. The orifice is equipped with a sealing device which can be, for example, a calibrated valve or a cover. When this orifice opens to the outside, the actuating pressure is constant, but the gases no longer pass through the cooling chambers and cannot be used for expanding inflatable structures, and when the orifice opens into the cooling chamber or chambers, the sealing device is only subjected to the differential pressure between the combustion chamber and the cooling chamber, and, since the pressure in the latter chamber can vary, with the residual amount of coolant and the distribution of this coolant in the chamber, the pressure in the combustion chamber, which causes the sealing device to open, is variable and leads to poor reliability in the generator operation.

Even in the absence of an excess pressure due to abnormal operation and of cooling chambers, the pressure in the combustion chamber of the known generators varies with the ambient temperature, since the rate of combustion of solid propellants varies with this temperature. For example, for a nominal pressure of 65 bars, the operating range is between 55 and 75 bars for extreme temperatures of −30° C and +80° C. This variation in the nominal pressure leads to undesirable variations in the performance of the generator and makes it necessary to arrange the pressure-limiting device to trigger at pressures which are sufficiently high to prevent any inopportune triggering of this device, such when the excess pressure is due only to the ambient temperature and not to abnormal operation of the generator.

The present invention aims at avoiding these disadvantages and accordingly provides a pyrotechnic gas generator comprising two parts fixed relative to each other, a tubular component having a closed end and an open end releasably held against one of the said parts by means interposed between the component and the other of said parts, a combustion chamber defined within the tubular component, a pyrotechnic charge and means for igniting the charge located in the chamber, a cooling chamber connected to the exterior of the generator by at least one aperture, and at least one charge of solid coolant located in the cooling chamber, the open end of the component being movable away from the said one part by gas pressure in the combustion chamber to form an orifice of variable through flow area interconnecting the combustion chamber and the cooling chamber for flow of gas therebetween.

The component may be of rigid construction and formed with injection nozzles connecting the chambers, the holding means for the component also being rigid and arranged to fracture when the pressure of the gases in the combustion chamber reaches a predetermined value. In this case the holding means can be a shearing ring engaging against the closed end of the compartment.

Alternatively, the holding means may be a toroid gasket of elastic material which deforms resiliently for regulating the operating pressure. The holding means can include a supplementary pressure-limiting device, such as a shearing ring on which the toroid gasket rests.

In another embodiment the closed end of the component is constructed from thin sheet metal and can undergo deformation, the holding means being rigid and engaging a central part of the closed end. The rigid holding means, for example a shearing ring, may be arranged to break when the pressure reaches a predetermined value.

The holding means may be arranged to undergo gradual deformation until a predetermined stress is reached, when a sudden change in shape occurs.

The holding means can in this case be a conical washer, or a washer of the Belleville type. Alternatively, the holding means may rupture instead of changing shape when the predetermined stress is reached.

With this embodiment it is possible both to regulate the pressure and to limit the pressure precisely.

The combustion and cooling chambers of the generator can be axially aligned or coaxial with the cooling chamber surrounding the combustion chamber.

Some embodiments of the invention are described in detail below, by way of example with reference to the accompanying drawings, in which.

Figure 1:
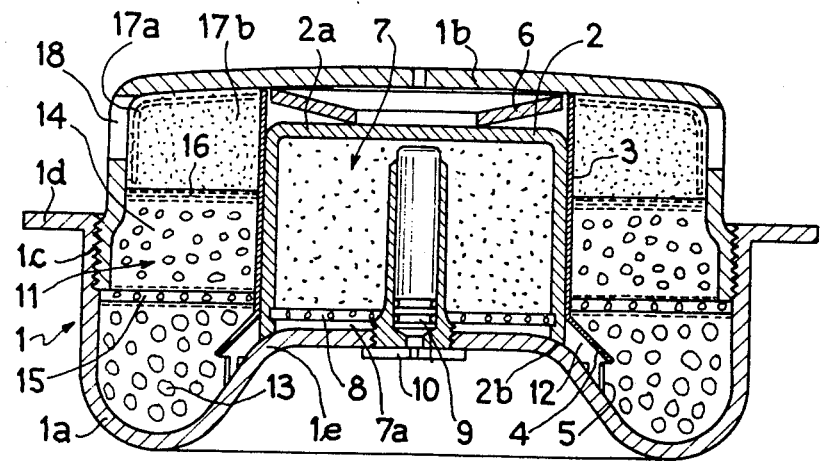
FIG. 1 is a cross-section through a first generator in accordance with the invention.

The pyrotechnic generator shown in FIG. 1 comprises an outer casing 1, shaped as a body of revolution, including a base 1a and a cover 1b firmly fixed to the base by a screw thread 1c. The upper rim of the base 1a is bent outwardly to form a mounting flange 1d, whilst the bottom wall 1e of the base is inwardly deformed at its centre.

Inside and coaxial with the outer casing is a cylindrical inner casing 2 closed at its upper end by a base 2a and open at its lower end with the rim 2b sealing against the deformed bottom wall 1e of the base 1a. The inner casing is axially slidable in a tubular guide 3 having an outwardly flared lower end portion forming a jet deflector 4, which is spaced from the wall 1e by spacers 5.

A Belleville washer 6 is inserted between the base 2a of the inner casing and the upper wall of the cover 1b and urges the inner casing downwardly.

The inside of the casing 2 defines a combustion chamber 7 and contains a pyrotechnic charge which is held in place by a retaining grid 8 slightly recessed relative to the rim 2b, so as to provide a free homogenisation space 7a. The pyrotechnic charge is a composite solid propellant comprising 9.8% of cellulose triacetate, 86.7% of potassium perchlorate and 3.5% of additives consisting of 3% of tricresyl phosphate and 0.5% of acetylene black, weighing 43 g and consisting of hollow strands extending parallel to the axis of the combustion chamber. The charge has a duration of combustion of 18 milliseconds and burns under a pressure of 60 bars at a temperature of about 1,300° C.

The charge is fired by an igniter 9 axially mounted in the combustion chamber, in an igniter support 10 fixed in the concave part of the base 1a. The igniter contains an igniting powder charge comprising 37% of zirconium and 63% of copper monoxide, which makes it possible to obtain a delay of approximately 3 milliseconds in igniting the solid propellant. The igniting charge is actuated by an ignition apparatus (not shown).

The annular chamber, defined between the guide 3 and the inner walls of the outer casing 1, forms a cooling chamber 11 into which opens the annular divergent injection orifice 12 delimited by the jet deflector 4 and the inner surface of the base 1a.

125 g of potassium perchlorate pellets containing a decomposition catalyst, such as copper chromite, are used, for example, as the first solid coolant charge 13 placed in the cooling chamber in the vicinity of the injection nozzle 12. The cylindrical pellets are 6 mm in diameter and 6 mm thick, and have a decomposition temperature of approximately 500° C. A second solid coolant charge 14 consisting, for example, of 100 g of sodium bicarbonate pellets is placed in the upper part of the cooling chamber above the first charge; the dimensions of these pellets are the same as or less than those of the pellets of potassium perchlorate, and they have a decomposition temperature of approximately 125° C. The two coolant charges are separated by a grid 15. To prevent particles of coolant being sprayed from the generator, retaining gauzes 16 are placed above the second charge and a filter including several layers of very fine grids 17a is positioned adjacent circular diffusion orifices 18 distributed around the periphery of the cover 1b. Granules 17b of corundum or alumina are placed between the retaining gauzes 16 and the grids 17a in order to complete the filtration process. Instead of the granules of corundum or alumina a filter of a woven metal fabric could be used.

In operation, the pyrotechnic charge is fired by the igniter 9. Under the effect of the pressure of the gases arising from the combustion of this charge, the inner casing 2 disengages from the wall 1e of the base 1a, thus opening an injection nozzle of variable cross-section. The casing 2 is acted upon by the pressure of the gases which is also exerted on the base of the said casing, and the reaction exerted by the Belleville washer on the base, thus permitting excellent control of the operating pressure of the generator.

The combustion gases are ejected through this nozzle and the injection orifice 12 into the cooling chamber 11 where they expand and are cooled by contact with the pellets of solid coolants 13 and 14.

The cooled gases are filtered by the filters 17a and 17b before being discharged through the diffusion orifices 18 for use such as to inflate a safety cushion between the dashboard and driver of an automobile.

With the described generator it is possible to obtain 64 liters of non-toxic gases within a period of time of between 30 and 40 milliseconds, the temperature of the gases produced not exceeding 200° C at the outlet of the generator and being substantially constant because the combustion gases are mixed with the coolant charges due to the combustion gases being expelled through the injection orifice and reflected by the outer casing of the generator. The annular distribution of the coolant charges has the advantage of providing only a limited distance between the two walls of the peripheral chamber, thus reducing the tendency to form preferential passages for the combustion gases.

The gases are obtained under sound level conditions which are completely acceptable and the gases are practically free from solid particles.

The composition of the gases emitted is given in the following table:

| Components | Concentration in % |
|---|---|
| Oxygen | 41 |
| Carbon dioxide | 41 |
| Water vapour | 17.8 |
| Carbon monoxide | 500 ppm |
| Nitrogen oxides | 5–10 ppm |

When, as a result of abnormal operation, the pressure of the gases in the combustion chamber reaches a determined limiting value, the Belleville washer 6 undergoes plastic deformation until it is completely flattened, and the inner casing 2 is pushed back by the gas pressure against the upper wall of the cover 1b. This causes a large increase in the surface area of the injection nozzle, to bring the pressure of the gases back almost instantaneously to an acceptable value. Thus, explosion of the generator is avoided, whilst the safety cushion is still expanded.

Thus, the Belleville washer functions both to regulate the normal working pressure and to limit the pressure.

Figure 2:
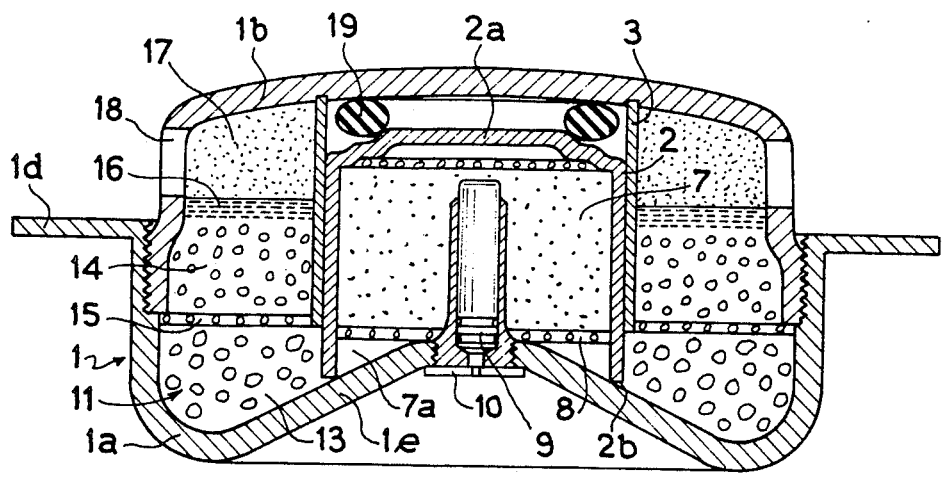
FIG. 2 is a cross-section through another generator in accordance with the invention.

In the generator shown in FIG. 2, the Belleville washer is replaced by a toroid gasket 19 of an elastic material, for example possessing a Shore hardness of 80.

In operation, this toroid gasket can undergo gradual deformation by compression to control the normal operating pressure of the generator.

A supplementary pressure-limiting device, such as a shearing ring, can be associated with this toroid gasket, but this is not essential since the crushing of the gasket in the event of abnormally high pressure is sufficient to limit the pressure in the combustion chamber to a safe level.

Figure 3:
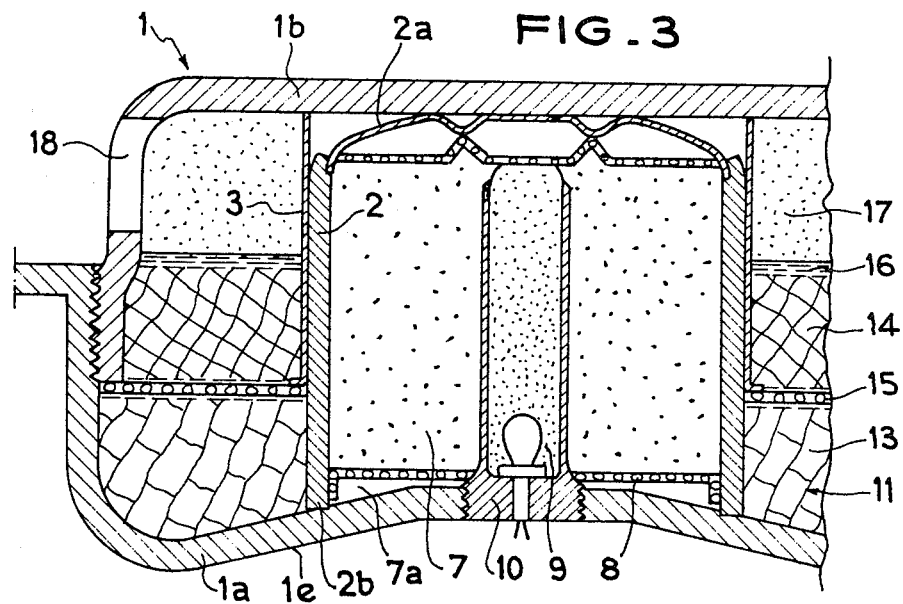
FIG. 3 is a cross-section through another generator.

In the gas generator illustrated in FIG. 3 the base 2a of the inner casing is formed from a material, such as thin sheet metal, which can undergo elastic deformation. This base bears directly against the cover 1b and undergoes gradual deformation when the inner casing is pushed back against the said wall by the pressure of the combustion gases, to permit good control of the normal operating pressure of the generator.

A supplementary pressure-limiting device (not shown) can also be associated with the base 2a, and which is elastically deformable. The supplementary pressure-limiting device may consist, for example, of a central axle having a shearing shoulder resting on a boss on the inside of the upper wall of the cover 1b, the boss having a bore for guiding the axle which is in contact with a reinforced central part of the base 2a of the inner casing.

Figure 4:
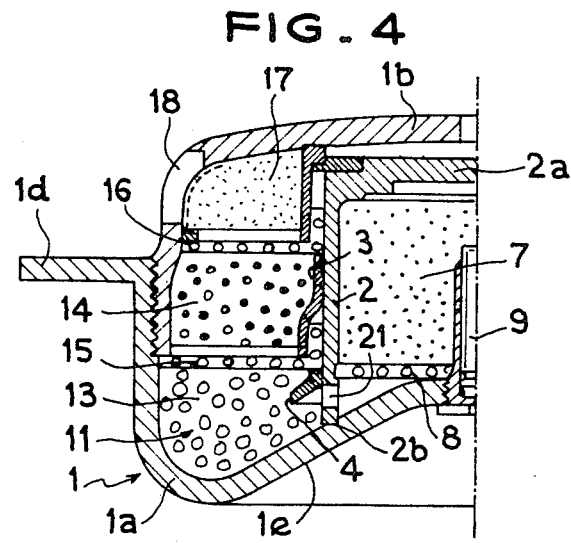
FIG. 4 is a cross-section through half of an alternative form of generator.

The generator illustrated in FIG. 4 has the inner casing 2 normally held pressed against the base 1e, by a shearing ring 20 fixed to the upper part of the tubular guide 3, and abutting against the periphery of the base 2a of the inner casing which is recessed to receive the ring.

Injection nozzle apertures 21 are provided in the side wall of the inner casing, in the immediate vicinity of the rim 2b. These nozzles are closed by covers which are broken as soon as the pressure in the combustion chamber reaches a preselected pressure, for example, 45 bars, which is below the normal operating pressure.

The shearing ring 20 breaks when the pressure in the combustion chamber reaches a predetermined value, for example 90 to 120 bars, as may occur under abnormal conditions.

The shearing ring limits the maximum pressure in the generator but does not control the normal operating pressure.

Figure 5:
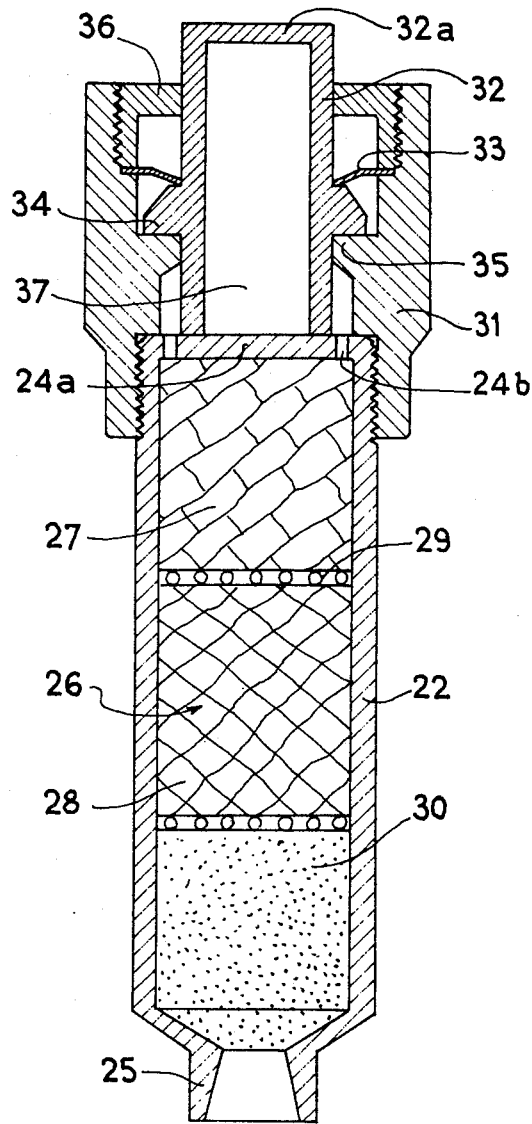
FIG. 5 is a cross-section through a linear generator embodying the invention.

The generator of FIG. 5 comprises a cylindrical tubular body 22 closed at one end by a base 24a pierced with orifices 24b around its periphery, which form injection nozzles. At its other end the body 22 is extended by a conical diffusion nozzle 25. The inside of the body 22 defines a cooling chamber 26, which contains a first solid coolant charge 27 comprising, for example, pellets of potassium perchlorate containing copper chromite as the decomposition catalyst and having a decomposition temperature of approximately 500° C. A second solid coolant charge 28 in the body comprises, for example, pellets of sodium bicarbonate having a decomposition temperature of approximately 125° C, and is separated from the first coolant charge by a retaining grid 29. A filter 30 comprising, for example, granules of corundum or alumina is also located in the body.

The tubular body 22 has its closed end firmly fixed to a hollow base-collar 31, inside which a cylindrical tubular component 32 is slidably mounted. The component is closed at its upper end by a base 32a and open at the other end with the rim 32b seated against the base 24a of the body 22 radially inside of the orifices 24b. The rim is held pressed against this base by a conical elastic washer 33 axially fixed to the tubular collar 31 and engaging a radial shoulder defined on the tubular component by a collar or flange 34. The component is guided as it moves axially by an annular centering rib 33 provided on the inner wall of the tubular collar, and by the rim of an aperture formed in base 36 of the collar.

The inside of the tubular component 32 defines a combustion chamber containing a pyrotechnic charge, such as a composite solid propellant as mentioned above, and an igniter for firing the charge.

In operation, the pressure of the gases arising from the combustion of the pyrotechnic charge is exerted on the base of the component 32 which disengages engages from the wall of the base 23. Thus the component 32 and base 23 define an injection nozzle possessing a variable cross-section, and the cross-section of which at any given time is determined by the combined effects of the pressure of the combustion gases of the reaction of the washer 33. This provides good control of the operating pressure of the generator.

The combustion gases are injected through the injection nozzle into the space between the component 32 and the collar in the portion below the rib 35, and, from there, through the orifices 24b into the cooling chamber 26.

The combustion gases expand in this chamber and are cooled by contact with the two charges of solid coolant. The cooled and filtered gases are discharged from the generator through the nozzle 25.

If the pressure in the combustion chamber reaches a determined abnormal level, the washer 33 fractures suddenly, releasing the component for free axial movement. As a result there is a large increase in the through flow area of the injection nozzle. Thus the washer also forms a pressure-limiting device.

Figure 6:
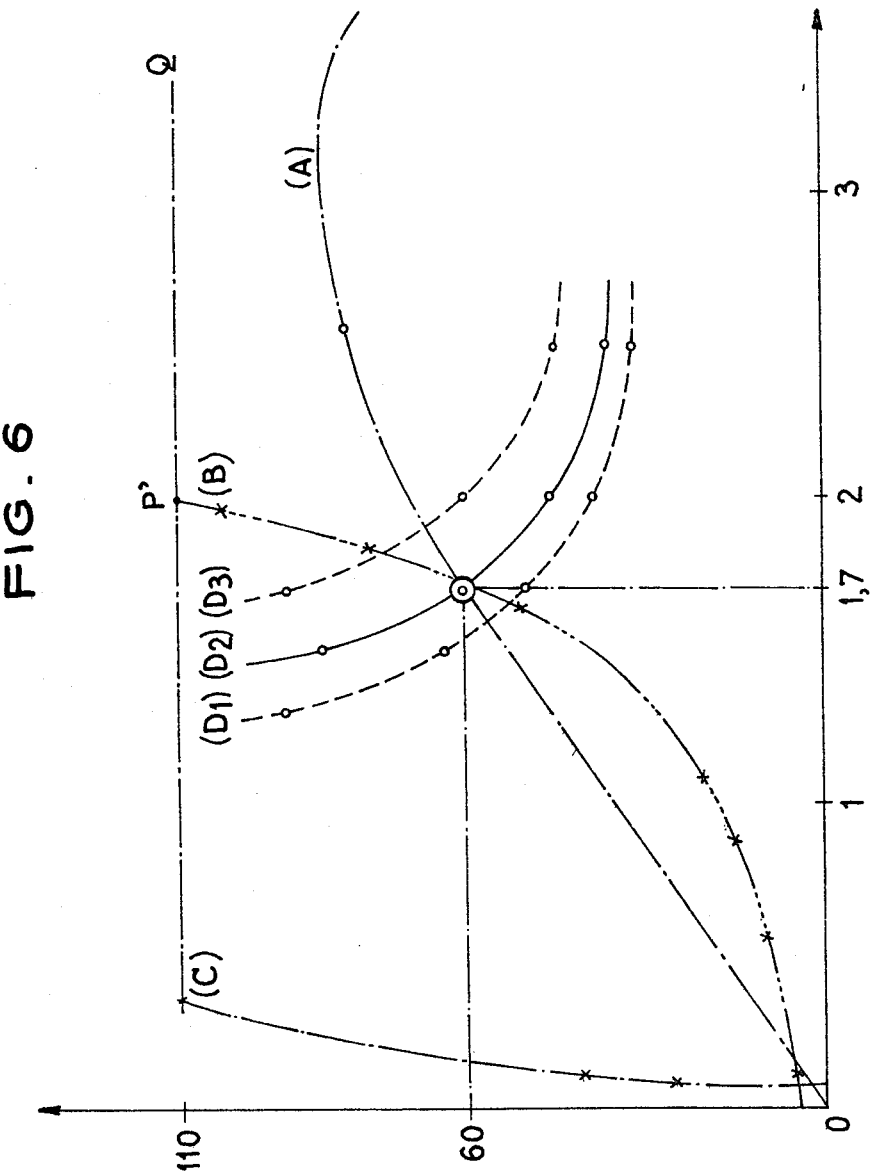
FIG. 6 is a diagram illustrating the operating characteristics of the generators shown in FIGS. 1, 2 and 4.

FIG. 6 is a diagram showing the operational characteristics of the gas generators of FIGS. 1, 2 and 4 having an operating pressure equal to 65 bars, in curves A, B and C respectively.

Pressure, in bars, in the combustion chamber is plotted on the ordinate, and the shift, in millimeters, of the inner casing 2 relative to the inner wall of the base 1e of the outer casing, which determines the through flow area of the injection nozzle, is plotted on the abscissae. These curves cut the pressure curves $D_1$, $D_2$, $D_3$ of the solid propellant at different ambient temperature (curve $D_1$ at −30° C, curve $D_2$ at +20° C and curve $D_3$ at +83° C) at the operating points of the generator. Thus, at a temperature of +20° C, the embodiments of FIGS. 1 and 2 will operate at a pressure of 60 bars and have a shift of 1.7 mm.

In the absence of any control of the normal operating combustion pressure, the fluctuations observed due to changes in ambient temperature are of the order of ± 10 bars and the variation in the operating pressure for a conventional pressure-limiting device is of the order of ± 15 bars depending on the pressure drops in the cooling chambers, and without taking into account the variable mechanical characteristics of the device. Curve B is the characteristic obtained using a toroid gasket possessing a Shore hardness of 80 (FIG. 2) and it can be seen that, in the event of abnormally high pressures, being present the increase in the surface area of the nozzle is only of the order of 50%. Curve A is the characteristic obtained using a washer of the Belleville type, the mounting of which permits a sudden reversal when the maximum pressure is reached (FIG. 1). This provides an inversion of the characteristic and the possibility of obtaining an increase in the nozzle area of more than 100%. Curve C is the characteristic obtained using a shearing ring (FIG. 4) and, as long as excess pressure does not induce sufficient shearing stress to fracture this ring, the combustion chamber is practically fixed. Control of the pressure can be achieved by using an elastic annular component placed in contact with the base of the inner casing and resting on the shearing ring, in which case the characteristic obtained corresponds to the segment OP of the curve B and the segment PQ of the curve C.

The Belleville washer has the advantage over a toroid gasket that, for a given pressure increase, the change in aperture size is larger. Thus, the pressure variations between firings under cold and hot conditions using a Belleville washer are approximately between 55 bars and 65 bars, instead of 45 to 80 bars as in the case of a chamber possessing a nozzle size which does not change.

Furthermore, regulating the pressure has the advantage that the maximum pressure in the generator is 85 bars using a Belleville washer, and the operating pressure varies less with the temperature.

We claim:

1. A pyrotechnic gas generator comprising two parts fixed relative to each other, a tubular component having a closed end and an open end positioned against one of the said parts, means interposed between said component and the other of said parts for releasably holding said open end of said component against said one part, a combustion chamber defined within said tubular component, a pyrotechnic charge and means for igniting said charge located in said chamber, means defining a cooling chamber, at least one aperture connecting said cooling chamber to the exterior of said generator, and at least one charge of solid coolant located in said cooling chamber, said open end of said component being movable away from said one part by gas pressure in said combustion chamber, and an orifice of variable through flow area being defined between said component and said one part when said component is moved away from said one part, said orifice interconnecting said combustion chamber and said cooling chamber for flow of gas therebetween.

2. A gas generator according to claim 1, wherein said tubular component is of rigid construction and has a plurality of injection nozzles connecting said combustion and cooling chambers, and said means holding the component is a rigid, frangible element arranged to fracture when the pressure of the gases in said combustion chamber reaches a predetermined value.

3. A gas generator according to claim 2, wherein said element is a shearing ring which engages said closed end of said component.

4. A gas generator according to claim 1, wherein said component is of a rigid construction and said means holding said component comprises a resiliently deformable element.

5. A gas generator according to claim 4, wherein said element is a toroid gasket of an elastically deformable material, which engages said closed end of said component.

6. A gas generator according to claim 5, wherein said component holding means includes a supplementary pressure-limiting member against which said toroid gasket abuts, and which is releasable to limit the maximum pressure in said combustion chamber.

7. A gas generator according to claim 1, wherein said closed end of said component is resiliently deformable and said means holding said component is a rigid element which engages the central part of said closed end.

8. A gas generator according to claim 7, wherein said closed end of said tubular component is constructed from sheet metal, and is gradually deformable for regulating the operating pressure of said generator.

9. A gas generator according to claim 7, wherein said rigid holding element is arranged to fracture when the pressure in said combustion chamber reaches a predetermined value.

10. A gas generator according to claim 1, wherein said tubular component is of a rigid construction and said holding means abuts against said closed end of said component and is resiliently deformable until a predetermined stress is reached when it suddenly changes in shape.

11. A gas generator according to claim 10, wherein said holding means is a conical washer, or a Belleville washer.

12. A gas generator according to claim 1, wherein said means holding said component is resiliently deformable until a predetermined stress is reached, when said holding means ruptures.

13. A gas generator according to claim 12, wherein said holding means is an elastic shearing ring.

14. A gas generator according to claim 1, including a guide, and wherein said tubular component is axially movable in said guide, and said cooling chamber is concentric with said combustion chamber and surrounds said component, the axial flow direction of said gases in said two chambers being reversed.

15. A gas generator according to claim 1, wherein said cooling chamber and said combustion chamber are axially aligned, said cooling chamber has a base with a central part, said open end of said component sealingly engages said central part of said base which forms said one part, injection nozzles are provided in said base at the periphery thereof, a tubular collar extends beyond said base and forms said other part, said component is located in said collar and said holding means is interposed between said component and said tubular collar.

16. A gas generator according to claim 1, wherein injection passages of low and constant cross-section are provided in said component adjacent said open end.

* * * * *